(12) United States Patent
Stewart et al.

(10) Patent No.: US 9,229,026 B2
(45) Date of Patent: Jan. 5, 2016

(54) ACCELEROMETER SYSTEMS AND METHODS

(75) Inventors: Robert E. Stewart, Woodland Hills, CA (US); Daryl Sakaida, Simi Valley, CA (US); Michael D. Bulatowicz, Canoga Park, CA (US); Ming Li, Camarillo, CA (US); John Thomson Douglass, Woodland Hills, CA (US)

(73) Assignee: Northrop Grumman Guaidance and Electronics Company, Inc., Woodland Hills, CA (US)

( * ) Notice: Subject to any disclaimer, the term of this patent is extended or adjusted under 35 U.S.C. 154(b) by 1063 days.

(21) Appl. No.: 13/085,900

(22) Filed: Apr. 13, 2011

(65) Prior Publication Data
US 2012/0265481 A1    Oct. 18, 2012

(51) Int. Cl.
*G01P 15/00*    (2006.01)
*G01P 15/13*    (2006.01)
*G01C 19/5705*    (2012.01)
(Continued)

(52) U.S. Cl.
CPC .......... *G01P 15/131* (2013.01); *G01C 19/5705* (2013.01); *G01P 15/125* (2013.01); *G01P 2015/0834* (2013.01)

(58) Field of Classification Search
CPC ................ G01P 15/131; G01P 15/125; G01P 2015/0834; G01C 19/5705
USPC ........ 702/141, 33, 47, 52, 53, 54, 91, 93, 104
IPC ............ G01P 2015/131, 2015/0834, 2015/0862
See application file for complete search history.

(56) References Cited

U.S. PATENT DOCUMENTS

| 4,517,841 | A | | 5/1985 | Peters et al. |
| 5,142,921 | A | * | 9/1992 | Stewart et al. ............... 73/866.1 |
| 5,473,946 | A | * | 12/1995 | Wyse et al. ................ 73/514.18 |

(Continued)

FOREIGN PATENT DOCUMENTS

| WO | WO 2006/134232 A1 | 12/2006 |
| WO | WO 2009/138498 A1 | 11/2009 |

OTHER PUBLICATIONS

International Search Report for corresponding PCT/US2012/029228 completed Jun. 19, 2012 by Blaine R. Copenheaver.

(Continued)

*Primary Examiner* — Andrew Schechter
*Assistant Examiner* — John Kuan
(74) *Attorney, Agent, or Firm* — Tarolli, Sundheim, Covell & Tummino LLP (57) ABSTRACT

An accelerometer system can include a sensor element comprising first and second proofmasses, the first proofmass accelerating in a first direction and the second proofmass accelerating in a second direction opposite the first direction in response to an external acceleration. A force rebalance controller applies control signals to at least one control element to provide a first force to accelerate the first proofmass toward a first null position and to at least one control element to provide a second force to accelerate the second proofmass toward a second null position. The force rebalance controller can also generate opposite polarity first and second output signals associated with respective displacements of the first and second proofmasses relative to the respective first and second null positions. An acceleration component calculates the external acceleration based on the first and second output signals.

20 Claims, 3 Drawing Sheets

(51) Int. Cl.
*G01P 15/125* (2006.01)
*G01P 15/08* (2006.01)

(56) References Cited

U.S. PATENT DOCUMENTS

| | | | |
|---|---|---|---|
| 5,659,195 A * | 8/1997 | Kaiser et al. | 257/415 |
| 5,817,939 A | 10/1998 | Lumley et al. | |
| 6,301,965 B1 | 10/2001 | Chu et al. | |
| 6,360,602 B1 * | 3/2002 | Tazartes et al. | 73/514.18 |
| 6,615,660 B1 | 9/2003 | Feinberg et al. | |
| 6,901,800 B2 | 6/2005 | Niendorf et al. | |
| 7,069,784 B1 | 7/2006 | Eskridge | |
| 7,178,398 B2 * | 2/2007 | Stewart | 73/514.01 |
| 7,444,868 B2 * | 11/2008 | Johnson | 73/504.12 |
| 7,640,786 B2 | 1/2010 | Stewart | |
| 7,640,803 B1 | 1/2010 | Gutierrez et al. | |
| 7,650,238 B2 * | 1/2010 | Reynolds et al. | 701/505 |
| 2003/0200807 A1 * | 10/2003 | Hulsing, II | 73/514.01 |
| 2006/0185433 A1 | 8/2006 | Leonardson et al. | |
| 2007/0000323 A1 | 1/2007 | Kuisma | |
| 2008/0000296 A1 | 1/2008 | Johnson | |
| 2008/0295597 A1 | 12/2008 | Stewart | |
| 2009/0095079 A1 | 4/2009 | Ayazi | |
| 2009/0183570 A1 | 7/2009 | Acar et al. | |
| 2010/0024552 A1 * | 2/2010 | Foster | 73/514.29 |
| 2012/0186347 A1 * | 7/2012 | McNeil | G01P 15/125 73/514.32 |
| 2012/0232832 A1 * | 9/2012 | Zhang et al. | 702/141 |

OTHER PUBLICATIONS

Supplementary European Search Report for corresponding EP 12 77 0723, completed Sep. 11, 2014.

* cited by examiner

ACCELEROMETER SYSTEMS AND METHODS

GOVERNMENT CONTRACT

This invention was made with Government support under Contract No. N66001-08-C-2045. The Government has certain rights in this invention.

TECHNICAL FIELD

The present invention relates generally to sensor systems, and specifically to accelerometer systems and methods.

BACKGROUND

In a force balanced sensing instrument, such as an accelerometer for example, it is generally desired that the instrument output signal be proportional to the input condition to be sensed. Therefore, in many types of electrostatic and electromagnetic force balanced sensing instruments special techniques are required to obtain a linear relation between the instrument output and the sensed input. In electrostatic and electromagnetic instruments, the forces applied by the instrument forcer are not linearly related to the feedback voltage or current supplied to the forcer. Furthermore, for optimum operation of the instrument itself it is preferred that the feedback force applied by the feedback control network have a linear relation to the sensed input. Thus, special techniques have been employed for obtaining such linearity.

For example, in an electrostatic force balanced accelerometer, electrostatic forcing in a closed loop system is employed to position and obtain an output from a pendulous inertial mass or proof mass. The electrostatic forcing system employs a capacitive pickoff electrode on each side of a pendulous member that has been etched from a silicon substrate. A control pulse is employed to sequentially apply a constant amount of charge to each electrode. A variable force is applied to the inertial mass by varying the amount of time (e.g., duty cycle) the charge is left on a respective plate. The amount of time the charge is left on a respective plate is based on the displacement of the inertial mass relative to a null position.

Accelerometer bias uncertainty can be a major source of error in inertial measurement and/or navigation systems. Bias uncertainty can arise due to transient behavior at turn on, non-modelability, and instability of bias versus temperature characteristics including hysteresis and simply trend over time. Mitigation of accelerometer bias uncertainty could significantly improve the performance of inertial measurement and navigation systems.

SUMMARY

An accelerometer system can include a sensor element comprising first and second proofmasses, the first proofmass accelerating in a first direction and the second proofmass accelerating in a second direction opposite the first direction in response to an external acceleration. A force rebalance controller applies control signals to at least one control element to provide a first force to accelerate the first proofmass toward a first null position and to at least one control element to provide a second force to accelerate the second proofmass toward a second null position. The force rebalance controller can also generate opposite polarity first and second output signals associated with respective displacements of the first and second proofmasses relative to the respective first and second null positions. An acceleration component calculates the external acceleration based on the first and second output signals.

Another embodiment of the invention includes a method for measuring an external acceleration in an accelerometer system. The method includes applying control signals to at least one control element associated with a first proofmass to provide a first force to accelerate the first proofmass toward a first null position associated with the first proofmass. The first proofmass can be configured to accelerate in a first direction in response to the external acceleration. The method also includes generating a first output signal of a first polarity associated with a displacement of the first proofmass relative to the first null position. The method also includes applying the control signals to at least one control element associated with a second proofmass to provide a second force to accelerate the second proofmass toward a second null position associated with the second proofmass. The second proofmass can be configured to accelerate in a second direction opposite the first direction in response to the external acceleration. The method also includes generating a second output signal of a second polarity associated with a displacement of the second proofmass relative to the second null position. The method further includes generating a difference between the magnitude (e.g., a value, such as a quantity of a signal including a polarity associated with the signal) of the first output signal and a magnitude of the second output signal to calculate the external acceleration that is substantially free from bias error.

Another embodiment of the invention includes an accelerometer system. The system includes a sensor element comprising a first proofmass and a second proofmass. The first proofmass can be configured to accelerate in a first direction and the second proofmass can be configured to accelerate in a second direction opposite the first direction in response to an external acceleration. The first proofmass and the second proofmass can be fabricated as substantially matched components, such that the first and second proofmasses are substantially identical with respect to temperature and process variation. The system also includes a force rebalance controller configured to alternately apply charge pulses to at least one electrode associated with the first proofmass and at least one electrode associated with the second proofmass in a predetermined sequence. The charge pulses can be applied to the at least one electrode associated with the first proofmass to provide a first electrostatic force to accelerate the first proofmass toward a first null position associated with the first proofmass and to apply the charge pulses to the at least one electrode associated with the second proofmass to provide a second electrostatic force to accelerate the second proofmass toward a second null position associated with the second proofmass. The force rebalance controller can be further configured to generate a first output signal associated with a displacement of the first proofmass relative to the first null position and a second output signal associated with a displacement of the second proofmass relative to the second null position based on applying the charge pulses to the at least one electrode associated with the respective first and second proofmasses. The second output signal has a polarity opposite the first output signal. The system further includes an acceleration component configured to subtract a magnitude of the first output signal from a magnitude of the second output signal to calculate the external acceleration that is substantially free from bias error.

DETAILED DESCRIPTION

The present invention relates generally to sensor systems, and specifically to accelerometer systems and methods. The accelerometer system includes a sensor element comprising a first proofmass and a second proofmass. The first and second proofmasses can be fabricated as matched components in a micro-electro-mechanical systems (MEMS) process, such that the proofmasses can be fabricated as substantially identical with respect to process and temperature variations. The proofmasses can be arranged such that the first proofmass accelerates in a first direction in response to an external acceleration and the second proofmass accelerates in a second direction opposite the first direction in response to the external acceleration. For example, the first and second proofmasses can have respective fulcrums that define a rotational axis, and can have respective centers of mass that are offset by equal and opposite distances from their respective rotational axes. As a result, the first and second proofmasses can rotate about their respective fulcrums in opposite rotational polarities in response to the external acceleration.

The accelerometer system can also include a force rebalance controller that includes a signal generator and a multiplexer. The signal generator can generate control signals and the multiplexer can apply the control signals to first and second sets of control elements that are associated with the respective first and second proofmasses in a predetermined sequence. For example, each of the first and second sets of control elements can include a first and second pair of electrically-coupled electrodes to which the control signals can be sequentially applied as charge pulses. The control signals thus generate a force to accelerate the first and second proofmasses in the respective second and first directions toward respective null positions to rebalance the proofmasses. The forces associated with the first and second proofmasses thus have an opposite polarity with respect to each other.

The force rebalance controller also includes a processor that can generate first and second output signals that are associated with the respective forces acting upon the first and second proofmasses. The output signals can be implemented to control a duration of application of the control signals to the first and second sets of control elements for rebalancing the first and second proofmasses. In addition, the output signals can be provided to an acceleration component, such as a Kalman filter, that can calculate the external acceleration based on the output signals. For example, the acceleration component can subtract the magnitude of the first output signal from the magnitude of the second output signal and rescale the difference (e.g., divide by two) to calculate the external force. Because bias error associated with the first and second proofmasses is independent of the polarity of the motion of the proofmasses, the effect of the bias error can be substantially canceled based on calculating the difference between the magnitudes of the first and second output signals. As a result, bias error can be substantially mitigated in the calculation of the external acceleration.

Figure 1:
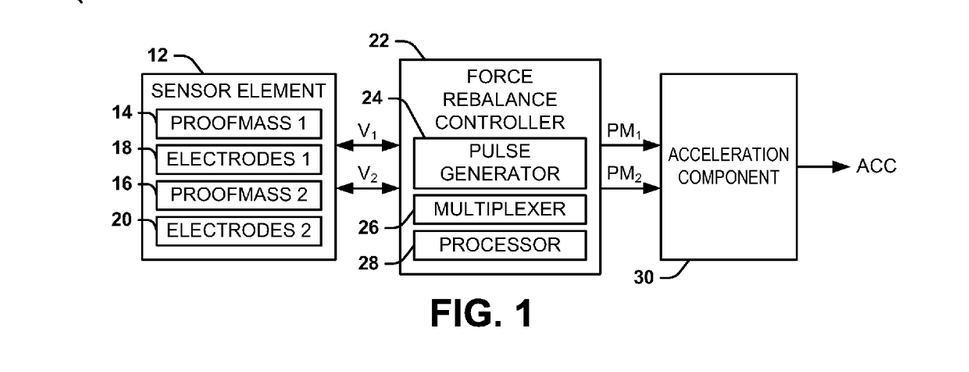
FIG. 1 illustrates an example of an accelerometer system in accordance with an aspect of the invention.

FIG. 1 illustrates an example of an accelerometer system 10 in accordance with an aspect of the invention. The accelerometer system 10 can be implemented in any of a variety of applications, such as for navigation and/or guidance systems. Thus, the accelerometer system 10 can be configured to calculate an external acceleration acting upon the accelerometer system 10, demonstrated in the example of FIG. 1 as a signal ACC. As described herein, an external acceleration is defined as an acceleration of the accelerometer system 10 resulting from an external force that is applied to the accelerometer system 10, and can include gravity as well as accelerations resulting from other external forces. Therefore, the accelerometer system 10 can be configured to substantially mitigate bias, such that the calculated acceleration ACC is substantially free from bias induced error.

The accelerometer system 10 includes a sensor element 12. The sensor element 12 includes a first proofmass 14 and a second proofmass 16. In addition, the sensor element 12 also includes a first set of electrodes 18 associated with the first proofmass 14 and a second set of electrodes 20 associated with the second proofmass 16. In the example of FIG. 1, the first proofmass 14 and the first set of electrodes 18 are designated as PROOFMASS 1 and ELECTRODES 1, respectively, and the second proofmass 16 and the second set of electrodes 20 are designated as PROOFMASS 2 and ELECTRODES 2. As an example, the first and second proofmasses 14 and 16 can be fabricated as matched components in a MEMS process, such that the first and second proofmasses 14 and 16 can be fabricated as substantially identical with respect to process and temperature variations.

The first and second proofmasses 14 and 16 can be arranged such that the first proofmass 14 accelerates in a first direction in response to an external acceleration and the second proofmass 16 accelerates in a second direction opposite the first direction in response to the external acceleration. For example, the first and second proofmasses 14 and 16 can have respective fulcrums that are collinear on a rotational axis, and can have respective centers of mass that are offset by equal and opposite distances from the rotational axis. As a result, the first and second proofmasses 14 and 16 can rotate about the fulcrums in opposite rotational polarities in response to the external acceleration.

The accelerometer system 10 also includes a force rebalance controller 22. The force rebalance controller 22 includes a pulse generator 24 and a multiplexer 26. The pulse generator 24 is configured to generate charge pulses of a substantially equal magnitude and polarity, and the multiplexer 26 is configured to provide the charge pulses to the sets of electrodes 18 and 20 in a predetermined sequence to generate electrostatic forces to accelerate the first and second proofmasses 14 and 16 toward respective null positions (i.e., to rebalance the first and second proofmasses 14 and 16). As described herein, a null position can describe a rest position associated with a respective one of the first and second proofmasses 14 and 16 at which the respective first or second proofmasses 14 and 16 is at zero displacement. As an example, the respective null positions can be positions at which the first and second proofmasses 14 and 16 are substantially coplanar, such that an external acceleration in either of opposite polarity vectors can accelerate the first proofmass 14 and the second proofmass 16 in opposite directions relative to each other.

As an example, the multiplexer 26 can alternately provide charge pulses generated by the pulse generator 24 to at least one of the first set of electrodes 18 then to another at least one of the first set of electrodes 18 to generate alternating electrostatic forces of opposite polarity. As a result, the first proofmass 14 is alternately accelerated in the first and second directions to position the first proofmass 14 toward the null position at each charge pulse application. The multiplexer 26 can then alternately provide the charge pulses to at least one of the second set of electrodes 20 then to another at least one of the second set of electrodes 20 to generate alternating electrostatic forces of opposite polarity. As a result, the second proofmass 16 is alternately accelerated in the first and second directions to position the second proofmass 16 toward the null position at each charge pulse application.

As a result of a capacitive coupling between the respective sets of electrodes 18 and 20 and the respective first and second proofmasses 14 and 16, a voltage is generated at the respective sets of electrodes 18 and 20 that is an indication of the relative displacement of the first and second proofmasses 14 and 16. In the example of FIG. 1, the voltages are demonstrated as a voltage $V_1$ and a voltage $V_2$. It is to be understood that the voltages $V_1$ and $V_2$ can each correspond to multiple voltages corresponding to separate electrodes (e.g., pairs of electrodes) of each of the first and second sets of electrodes 18 and 20. The voltages $V_1$ and $V_2$ can thus each be proportional to a displacement (i.e., capacitive gap) of the first and second proofmasses 14 and 16 relative to the respective sets of electrodes 18 and 20. Accordingly, the voltages $V_1$ and $V_2$ can provide an indication of a magnitude of the relative displacements of the first and second proofmasses 14 and 16.

The force rebalance controller 22 also includes a processor 28. The processor 28 is configured to communicate with the pulse generator 24 to set a duty-cycle of the charge pulses for the proper rebalancing of the first and second proofmasses 14 and 16. Specifically, the longer the period of time that the electrostatic force is provided based on application of the charge pulses, the more the respective one of the first and second proofmasses 14 and 16 can be accelerated. As a result, the processor 28 can set the duty-cycle between alternate application of the charge pulses to each of the sets of electrodes 18 and 20 to properly rebalance the first and second proofmasses 14 and 16 toward their respective null positions, even in the presence of an external acceleration. In addition, the processor 28 can be configured to generate a set of output signals $PM_1$ and $PM_2$ based on the voltages $V_1$ and $V_2$ that correspond to the displacement of the first and second proofmasses 14 and 16, such as resulting from an external acceleration. In the example of FIG. 1, the output signals $PM_1$ and $PM_2$ are provided to an acceleration component 30. As an example, the acceleration component 30 can be configured as a Kalman filter. The acceleration component 30 can thus be configured to calculate the magnitude of the external acceleration based on the output signals $PM_1$ and $PM_2$. The calculated external acceleration is demonstrated in the example of FIG. 1 as a signal ACC.

Bias uncertainty can arise from a number of factors and can result in errors in the calculation of an external acceleration in typical accelerometer systems. As an example, mechanical bias uncertainty can be present based on fabrication conditions of a proofmass, or can likewise arise from electronic systems that calculate the acceleration. Additionally, the bias uncertainty can change with temperature or over time.

In the accelerometer system 10, because the voltages $V_1$ and $V_2$ are each associated with the electrostatic forces of opposite polarity to accelerate the first and second proofmasses 14 and 16 in opposite polarity directions relative to each other in response to an external acceleration for rebalancing toward the respective null positions, the voltages $V_1$ and $V_2$ have opposite polarities with respect to each other. However, bias uncertainty resulting from the first and second proofmasses 14 and 16 and the electronics of the force rebalance controller 22, such as can affect the voltages $V_1$ and $V_2$, has a polarity that is independent of the polarity of motion of the first and second proofmasses 14 and 16. As a result, the acceleration component 30 can be configured to calculate a difference between the magnitude of the output signal $PM_1$ and the output signal $PM_2$. Accordingly, any error resulting from bias uncertainty is factored out from the resulting difference, leaving a difference that is indicative of approximately twice the magnitude of the external acceleration. The acceleration component 30 can thus rescale the difference (e.g., divide by two) to calculate the actual external acceleration ACC.

As a result of the subtraction of the output signals $PM_1$ and $PM_2$ having magnitudes associated with the opposite polarity electrostatic forces that rebalance the first and second proofmasses 14 and 16, the acceleration component 30 can thus calculate the external acceleration ACC that is substantially free from bias error. Therefore, the accelerometer system 10 is self-calibrating with respect to bias uncertainty. Such a difference between the output signals $PM_1$ and $PM_2$ can be associated with twice the external acceleration acting upon the sensor element 12 based on the fabricated matching of the first and second proofmasses 14 and 16, as well as the common processor 28 for generation of the output signals $PM_1$ and $PM_2$ based on the respective voltages $V_1$ and $V_2$, thus resulting in a simple calculation of the external acceleration ACC by the acceleration component 30. In addition, the acceleration component 30 can likewise sum the output signals $PM_1$ and $PM_2$ to cancel the external acceleration, thus leaving a sum that is associated with a magnitude of the total bias error. Furthermore, by implementing both of the first and second proofmasses 14 and 16 instead of a single proofmass, uncorrelated noise in the accelerometer system 10 can be substantially reduced by the square root of two.

Figure 2:
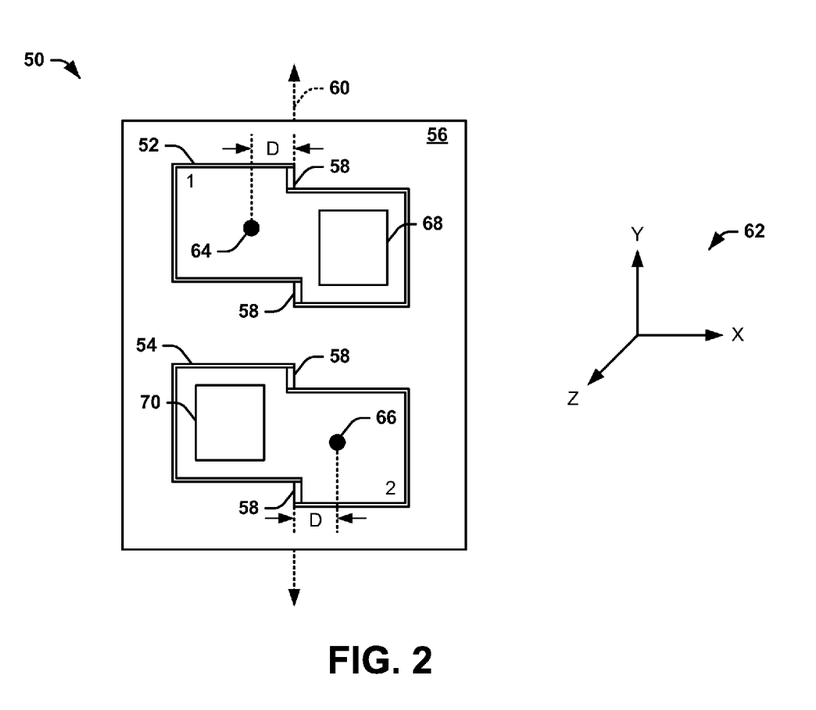
FIG. 2 illustrates an example of a sensor element in accordance with an aspect of the invention.

FIG. 2 illustrates an example of a sensor element 50 in accordance with an aspect of the invention. The sensor element 50 can correspond to the sensor element 12 in the example of FIG. 1. Therefore, reference is to be made to the example of FIG. 1 in the following description of the example of FIG. 2.

The sensor element 50 includes a first proofmass 52 and a second proofmass 54 coupled to a sensor body 56. In the example of FIG. 2, the first proofmass 52 is demonstrated with an identifier "1" and the second proofmass 54 is demonstrated with an identifier "2", thus corresponding to the first and second proofmasses 14 and 16 in the example of FIG. 1. Thus, similar to as described above, the first and second proofmasses 52 and 54 can be fabricated as matched components in a MEMS process, such that the first and second proofmasses 52 and 54 can be fabricated as substantially identical with respect to process and temperature variations.

The first and second proofmasses 52 and 54 are demonstrated as coupled to the sensor body 56 via flexures 58. The flexures 58 are all arranged to provide flexibility in a substantially collinear manner about an axis 60. In the example of FIG. 2, the axis 60 is demonstrated in the +/− Y-axis according to a Cartesian coordinate system 62. As a result, the first and second proofmasses 52 and 54 are configured to rotate about the axis 60 in response to an acceleration in the +Z direction or the −Z direction. In the example of FIG. 2, the rotation of the first proofmass 52 can be substantially equal and can have an opposite polarity with respect to the rotation of the second proofmass 54. For example, the first proofmass 52 can have a center of mass 64 that is offset from the axis 60 by a distance "D". Similarly, the second proofmass 54 can have a center of mass 66 that is likewise offset from the axis 60 by the distance "D", but on the opposite side of the second proofmass 54 relative to the center of mass 64 of the first proofmass 52. As a result of the approximately equal and opposite centers of mass 64 and 66, the first and second proofmasses 52 and 54 can rotate about the axis 60 in a substantially equal and opposite polarity in response to an external acceleration.

In the example of FIG. 2, the offset centers of mass 64 and 66 are demonstrated as resulting from the fabrication of the first and second proofmasses 52 and 54. Specifically, the first proofmass 52 is demonstrated as including a cavity 68 that has been etched into the first proofmass 52, such as during fabrication of the first proofmass 52. Similarly, the second proofmass 54 is demonstrated as including a cavity 70 that has been etched into the second proofmass 54, such as during fabrication of the second proofmass 54. As a result of the etching of the cavities 68 and 70, the centers of mass 64 and 66 of the first and second proofmasses 52 and 54 are offset from an approximate centroid location, located on the axis 60, along the X-axis in the direction opposite the respective cavities 68 and 70. Accordingly, based on the equal and opposite centers of mass 64 and 66 and substantial fabricated matching of the first and second proofmasses 52 and 54, the respective rotation of the first and second proofmasses 52 and 54 about the axis 60 via the flexures 58 is approximately equal and with opposite polarity in response to an external acceleration.

It is to be understood that the sensor element 50 is not intended to be limited to the example of FIG. 2. For example, the first and second proofmasses 52 and 54 are not intended to be limited to the shape, orientation, or location on the sensor body 56 that is demonstrated in the example of FIG. 2, but could instead be arranged in any of a variety of different ways to provide substantially equal acceleration in opposite polarities in response to an external force. Additionally, the manner in which the centers of mass 64 and 66 become offset from the axis 60 is not limited to etching the respective cavities 68 and 70, but could instead result from different fabrication techniques, such as fabricating the first and second proofmasses 52 and 54 to each be shorter or thicker on one end in substantially equal and opposite ways. Furthermore, the sensor element 50 is not limited to implementing rotation of the respective first and second proofmasses 52 and 54 about a common axis (i.e., the axis 60), but could instead have fulcrums that are non-collinear. Therefore, the sensor element 50 can be configured in any of a variety of ways.

Figure 3:
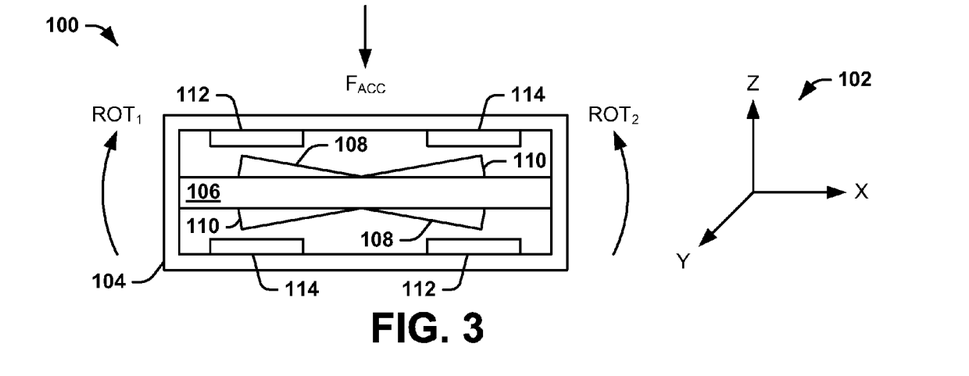
FIG. 3 illustrates another example of a sensor element in accordance with an aspect of the invention.

FIG. 3 illustrates another example of a sensor element 100 in accordance with an aspect of the invention. The sensor element 100 is demonstrated in a cross-sectional view looking in the +Y direction orthogonal to the XZ-plane of the Cartesian coordinate system 62 of the example of FIG. 2, and thus similarly demonstrated in a Cartesian coordinate system 102 in the example of FIG. 3. The sensor element 100 also includes a sensor housing 104 which encloses a sensor body 106, as well as a first proofmass 108 and a second proofmass 110 which can correspond to the first and second proofmasses 52 and 54 in the example of FIG. 2. As an example, the sensor housing 104 can be filled with a gas to provide damping and velocity storage within the sensor element 100.

In addition, the sensor element 100 includes a first pair of electrically-coupled electrodes 112 and a second pair of electrically-coupled electrodes 114 that are coupled to an interior surface of the sensor housing 104. The electrodes 112 and 114 demonstrated in the example of FIG. 3 can be located above and below the second proofmass 110. Thus, the sensor element 100 can also include two pairs of electrically-coupled electrodes (not shown) that are similarly located above and below the first proofmass 108, for a total of eight electrodes within the interior of the sensor housing 104. As described in greater detail below, the first and second pairs of electrodes 112 and 114 can be provided charge pulses such as generated from the pulse generator 24 in the example of FIG. 1, to generate an electrostatic force for rebalancing the first and second proofmasses 108 and 110.

In the example of FIG. 3, an external force $F_{ACC}$ is demonstrated as applied to the sensor element 100 in the −Z direction. The external forces $F_{ACC}$ thus provides an external acceleration of the sensor element 100 in the −Z direction. In response to the external acceleration in the −Z direction, the first and second proofmasses 108 and 110 each rotate in opposite polarity directions. In the example of FIG. 3 the rotation of the first proofmass 108 is demonstrated as a rotation $ROT_1$ in the clockwise direction based on the first proofmass 108 having a center of mass that is offset from an axis through which a fulcrum of the first proofmass 108 extends, and the rotation of the second proofmass 110 is demonstrated as a rotation $ROT_2$ in the counter-clockwise direction based the second proofmass 110 having a center of mass that is substantially equal and opposite the first proofmass 108. It is to be understood that, in the example of FIG. 3, the first and second proofmasses 108 and 110 are not demonstrated in the respective null positions, as the respective null positions can be positions that are substantially coplanar with the sensor body 106. Instead, the first and second proofmasses 108 and 110 are demonstrated as having accelerated in response to the external force $F_{ACC}$ to illustrate the respective rotations resulting from the external acceleration of the sensor element 100.

It is to be understood that the sensor element 100 is not intended to be limited to the example of FIG. 3. For example, the force rebalancing of the first and second proofmasses 108 and 110 is not intended to the application of charge pulses to electrodes to generate an electrostatic force. For example, the sensor element 100 can receive other types of control signals at respective control elements to generate forces for rebalancing the respective first and second proofmasses 108 and 110. As an example, the sensor element 100 can implement electro-magnetic or other types of forces for rebalancing the first and second proofmasses 108 and 110. Therefore, the sensor element 100 can be configured in any of a variety of ways.

Figure 4:
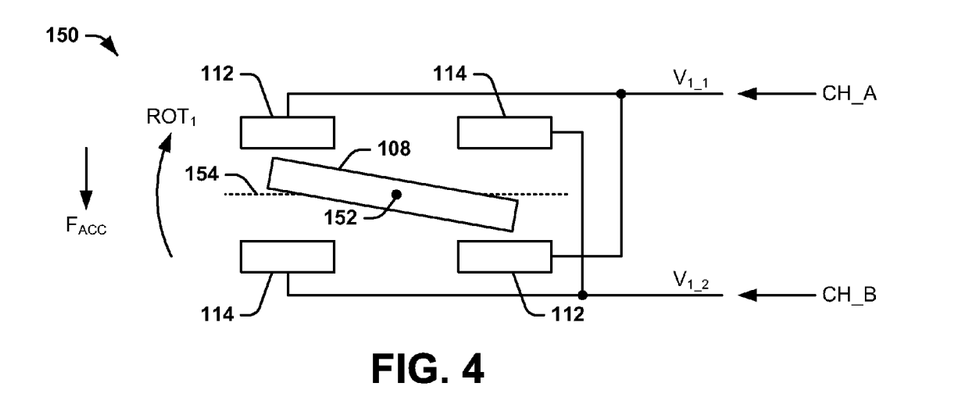
FIG. 4 illustrates an example diagram of a proofmass in accordance with an aspect of the invention.

FIG. 4 illustrates an example diagram 150 of the proofmass 108 in accordance with an aspect of the invention. The proofmass 108 is demonstrated as rotating about a fulcrum 152, as demonstrated by the rotation $ROT_1$, in response to the external force $F_{ACC}$ that causes the external acceleration of the sensor element 100 in the −Z direction (with reference to the example of FIG. 3). As described above, the proofmass 108 is demonstrated as having the clockwise rotation $ROT_1$ based on the proofmass 108 having a center of mass that is offset from the fulcrum 152. As a result, the proofmass 108 is demonstrated as being offset from the first electrically-coupled electrodes 112 by a shorter distance than the second electrically-coupled electrodes 114.

In the example of FIG. 4, a null position is demonstrated at 154 as a position at which the proofmass 108 is approximately equidistance from both pairs of electrodes 112 and 114. To rebalance the proofmass 108 toward the null position 154, a force rebalance controller, such as the force rebalance controller 22 in the example of FIG. 1, can generate charge pulses CH_A and CH_B that are applied to the respective pairs of electrodes 112 and 114. It is to be understood that the charge pulses CH_A and CH_B can be generated from a common pulse generator (e.g., the pulse generator 24), such that the charge pulses CH_A and CH_B have substantially equal magnitudes and are time-divided in a predetermined sequence between the first pair of electrodes 112 and the second pair of electrodes 114 based on a duty-cycle (e.g., as set by the processor 28) that is sufficient to provide an electrostatic force to rebalance the proofmass 108 toward the null position 154 (i.e., in the counter-clockwise direction).

Upon applying the charge pulses CH_A to the first pair of electrodes 112, a voltage $V_{1\_1}$ is induced on the first pair of electrodes 112. The voltage $V_{1\_1}$ is based on the capacitive gap that is formed between the first pair of electrodes 112 and the proofmass 108 as the electrostatic force resulting from the application of the charge pulse CH_A is provided. Specifically, the capacitance formed by the proofmass 108 relative to the first pair of electrodes 112 is inversely proportional to the gap between the proofmass 108 and the first pair of electrodes 112, with a charge of the charge pulse CH_A being equal to the capacitance times the voltage $V_{1\_1}$. Therefore, the voltage $V_{1\_1}$ is proportional to the gap between the first pair of electrodes 112 and the proofmass 108, and can thus be associated with the displacement of the proofmass 108 resulting from the external acceleration of the sensor element 100. Similarly, upon applying the charge pulses CH_B to the second pair of electrodes 114, a voltage $V_{1\_2}$ is induced on the second pair of electrodes 114. The voltage $V_{1\_2}$ can likewise be proportional to the gap between the first pair of electrodes 112 and the proofmass 108, and can thus be associated with the displacement of the proofmass 110 resulting from the external acceleration of the sensor element 100.

Figure 5:
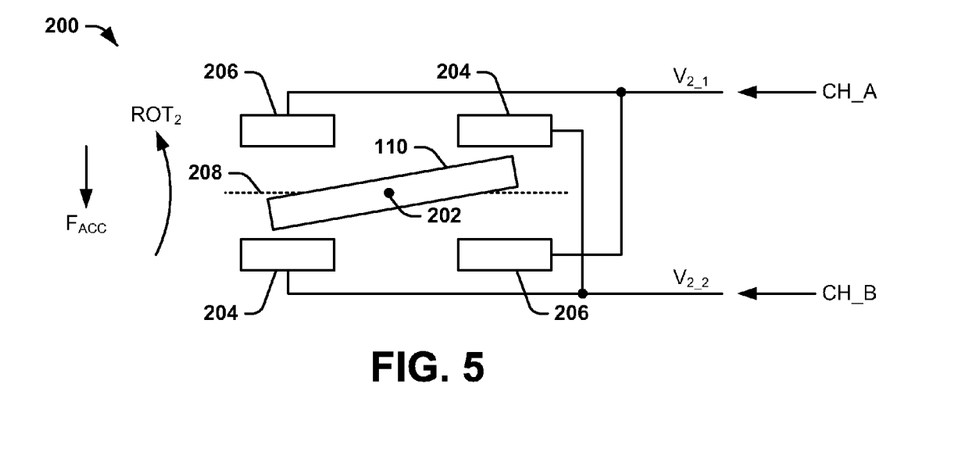
FIG. 5 illustrates another example diagram of a proofmass in accordance with an aspect of the invention.

FIG. 5 illustrates an example diagram 200 of the proofmass 110 in accordance with an aspect of the invention. The proofmass 110 is demonstrated as rotating about a fulcrum 202, as demonstrated by the rotation $ROT_2$, in response to the external force $F_{ACC}$ that causes the external acceleration of the sensor element 100 in the −Z direction (with reference to the example of FIG. 3). As described above, the proofmass 110 is demonstrated as having the counter-clockwise rotation $ROT_2$ based on the proofmass 110 having a center of mass that is offset from the fulcrum 202 equal and opposite the first proofmass 108. As a result, the proofmass 110 is demonstrated as being offset from a first pair of electrically-coupled electrodes 204 by a shorter distance than a second pair of electrically-coupled electrodes 206 in a manner that is opposite the spacing of the first proofmass 108 and the respective pairs of electrodes 112 and 114 in the example of FIG. 4. The first and second pairs of electrodes 204 and 206 thus correspond in location to the second and first pairs of electrodes 114 and 112, respectively, relative to the respective proofmasses 110 and 108.

To rebalance the proofmass 110 to a null position 208, the force rebalance controller can apply the charge pulses CH_A and CH_B to the respective pairs of electrodes 204 and 206. It is to be understood that the charge pulses CH_A and CH_B can be the same charge pulses CH_A and CH_B as those applied to the electrodes 112 and 114 in the example of FIG. 4, such as from the pulse generator 24, that are alternately multiplexed to the pairs of electrodes 204 and 206 in the example of FIG. 5 (e.g., via the multiplexer 26) in a predetermined sequence. Similar to as described above in the example of FIG. 4, the charge pulses CH_A and CH_B can have substantially equal magnitudes and can be time-divided in a predetermined sequence between the first pair of electrodes 112 and the second pair of electrodes 114 based on a duty-cycle (e.g., as set by the processor 28) that is sufficient to provide an electrostatic force to rebalance the proofmass 110 toward the null position 208 (i.e., in the clockwise direction).

Similar to as described above in the example of FIG. 4, upon applying the charge pulses CH_A to the second pair of electrodes 206, a voltage $V_{2\_1}$ is induced on the second pair of electrodes 206. Similarly, upon applying the charge pulses CH_B to the first pair of electrodes 204, a voltage $V_{2\_2}$ is induced on the first pair of electrodes 204. The voltages $V_{2\_1}$ and $V_{2\_2}$ are based on the capacitive gaps that are formed between the proofmass 110 and the respective second and first pairs of electrodes 206 and 204. Therefore, as demonstrated in the examples of FIGS. 4 and 5, the voltages $V_{1\_1}$ and $V_{2\_2}$ should be approximately equal, and the voltages $V_{1\_2}$ and $V_{2\_1}$ should be approximately equal. However, bias associated with one or both of the proofmasses 108 and 110 can impact the magnitudes of the voltages $V_{1\_1}$ and $V_{2\_2}$ or the voltages $V_{1\_2}$ and $V_{2\_1}$ relative to each other.

The force rebalance controller 22 in the example of FIG. 1 can generate the output signal $PM_1$ based on the voltages $V_{1\_1}$ and $V_{1\_2}$ and the output signal $PM_2$ based on the voltages $V_{2\_1}$ and $V_{2\_2}$. As a result, bias resulting from one or both of the proofmasses 108 and 110 can affect the proofmasses 108 and 110 in substantially the same way, such that the bias is independent of the polarity of rotation of the respective proofmasses 108 and 110. Therefore, the output signals $PM_1$ and $PM_2$ can be provided to the acceleration component 30, such that the acceleration component 30 can subtract the magnitude of the output signal $PM_1$ from the magnitude of the output signal $PM_2$ (or vice versa) to calculate the external acceleration of the sensor element 100. Because the bias affecting the magnitudes of the output signals $PM_1$ and $PM_2$ have the same polarity, applying the difference between the output signals $PM_1$ and $PM_2$ can substantially cancel the bias, resulting in a scaled magnitude of the external acceleration that is substantially free from bias error. Accordingly, the accelerometer system described herein can be substantially more accurate than typical accelerometer systems.

Figure 6:
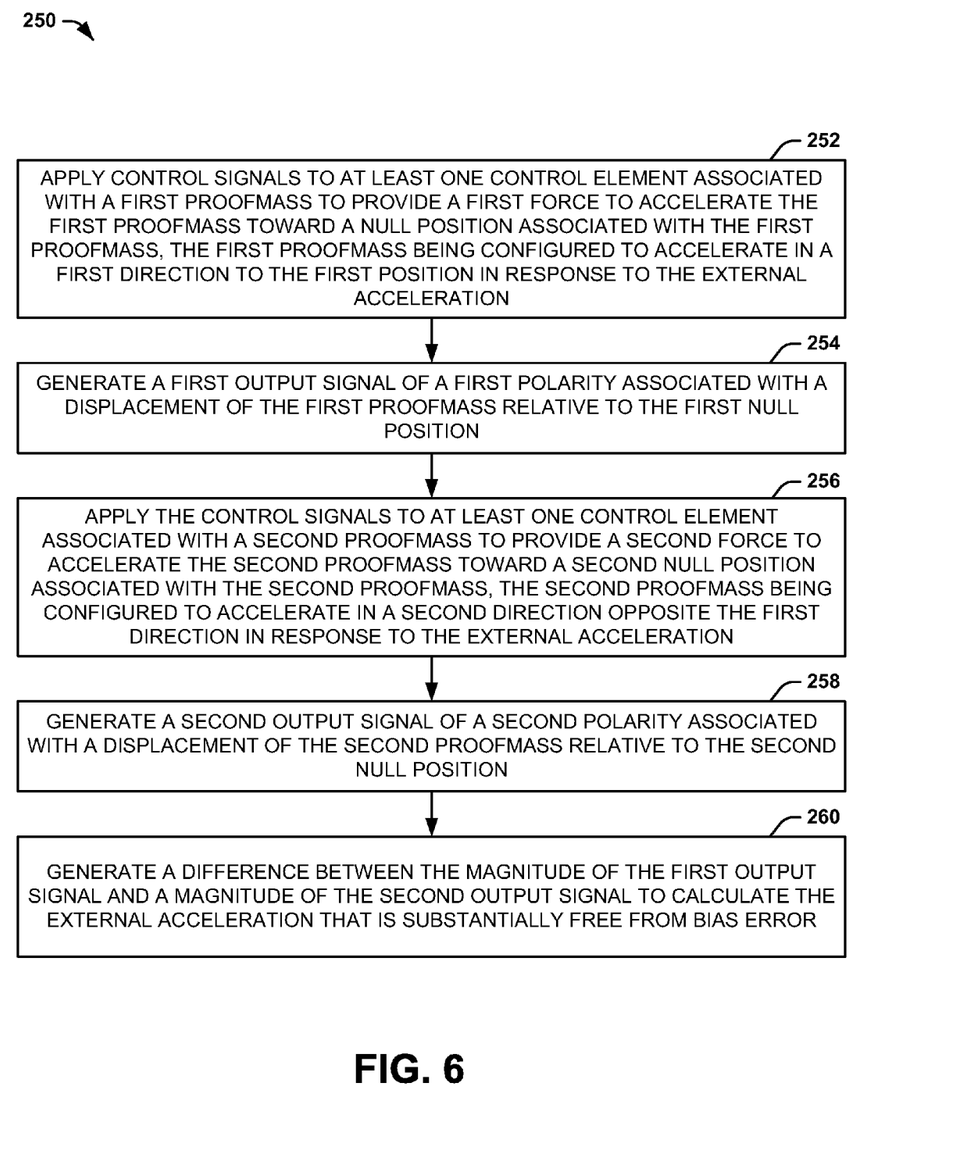
FIG. 6 illustrates an example of a method for measuring an external acceleration in an accelerometer system in accordance with an aspect of the invention.

In view of the foregoing structural and functional features described above, a methodology in accordance with various aspects of the present invention will be better appreciated with reference to FIG. 6. While, for purposes of simplicity of explanation, the methodology of FIG. 6 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 6 illustrates a method 250 for measuring an external acceleration in an accelerometer system. At 252, control signals are applied to at least one control element associated with a first proofmass to provide a first force to accelerate the first proofmass toward a first null position associated with the first proofmass, the first proofmass being configured to accelerate in a first direction in response to the external acceleration. At 254, a first output signal of a first polarity associated with a displacement of the first proofmass relative to the first null position is generated. At 256, the control signals are applied to at least one control element associated with a second proofmass to provide a second force to accelerate the second proofmass toward a second null position associated with the second proofmass, the second proofmass being configured to accelerate in a second direction opposite the first direction in response to the external acceleration. At 258, a second output signal of a second polarity associated with a displacement of the second proofmass relative to the second null position is generated. The first and second proofmasses can be fabricated as matched components, such that they are affected substantially the same by process and temperature variations. The first and second directions can be opposite rotational directions based on equal and opposite offsets in center of mass from respective fulcrums.

At 260, a difference between the magnitude of the first output signal and a magnitude of the second output signal is generated to calculate the external acceleration that is substantially free from bias error. Bias in one or both of the first and second proofmasses have the same polarity regardless of the rotational movement of the respective proofmass, and thus affect the output signals in an approximately equal manner. Therefore, subtracting the output signals can substantially cancel the bias error in the external acceleration.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. An accelerometer system comprising:
    a sensor element comprising a first proofmass and a second proofmass, the first proofmass being configured to rotate in a first direction and the second proofmass being configured to rotate in a second direction opposite the first direction about a common axis in response to an external acceleration;
    a force rebalance controller configured to apply control signals to at least one control element associated with the first proofmass to provide a first force to accelerate the first proofmass toward a first null position associated with the first proofmass and to apply control signals to at least one control element associated with the second proofmass to provide a second force to accelerate the second proofmass toward a second null position associated with the second proofmass, the force rebalance controller being further configured to generate a first output signal associated with a displacement of the first proofmass relative to the first null position and a second output signal associated with a displacement of the second proofmass relative to the second null position based on applying the control signals to the at least one control element associated with the first and second proofmasses, the second output signal having a polarity opposite the first output signal; and
    an acceleration component configured to calculate the external acceleration based on both the first and second output signals.

2. The system of claim 1, wherein the acceleration component is configured to subtract the first output signal from the second output signal to substantially cancel bias error in the calculated external acceleration.

3. The system of claim 2, wherein the acceleration component is configured to scale a difference between the first output signal and the second output signal to calculate the external acceleration having an uncorrelated noise that is reduced by approximately the square root of two.

4. The system of claim 1, wherein the first proofmass and the second proofmass are fabricated as substantially matched components, such that the first and second proofmasses are substantially identical with respect to temperature and process variation.

5. The system of claim 1, wherein the first proofmass is configured to rotate about a first fulcrum in the first and second directions and the second proofmass is configured to rotate about a second fulcrum in the first and second directions.

6. The system of claim 5, wherein the first proofmass comprises a center of mass that is offset from a centroid location of the first proofmass by a distance that is approximately equal and opposite an offset of a center of mass associated with the second proofmass relative a centroid location of the second proofmass.

7. The system of claim 6, wherein a portion of each of the first and second proofmasses is etched away during fabrication to shift the center of mass associated with each of the first and second proofmasses to equal and opposite distances offset from the common axis.

8. The system of claim 1, wherein the at least one control element associated with each of the respective first and second proofmasses comprises at least one electrode associated with each of the respective first and second proofmasses, and wherein the force rebalance controller comprises:
    a pulse generator configured to generate the control signals as charge pulses;
    a multiplexer configured to alternate application of the charge pulses between the at least one electrode associated with the first proofmass and the at least one electrode associated with the second proofmass in a predetermined sequence to generate the respective first and second forces as respective first and second electrostatic forces; and
    a processor configured to generate the first output signal in response to a first measured voltage associated with the at least one electrode associated with the first proofmass and to generate the second output signal in response to a second measured voltage associated with the at least one electrode associated with the second proofmass, the first and second measured voltages resulting from the alternate application of the charge pulses to the at least one electrode associated with the respective first and second proofmasses.

9. The system of claim 8, wherein the pulse generator is configured to generate the charge pulses at a first duty-cycle with respect to the at least one electrode associated with the first proofmass based on the first output signal and at a second duty-cycle with respect to the at least one electrode associated with the second proofmass based on the second output signal.

10. The system of claim 8, wherein each of the at least one electrode associated with the first and second proofmasses comprises a first pair of electrodes that are electrically-coupled with respect to each other and a second pair of electrodes that are electrically-coupled with respect to each other, the multiplexer being configured to apply the charge pulses to the first pair of electrodes to accelerate the respective first and second proofmasses in a first direction and to apply the charge pulses to the second pair of electrodes to accelerate the respective first and second proofmasses in a second direction opposite the first direction.

11. A method for measuring an external acceleration in an accelerometer system, the method comprising:
    applying control signals to at least one control element associated with a first proofmass to provide a first force to accelerate the first proofmass toward a first null position associated with the first proofmass, the first proofmass being configured to accelerate in a first direction in response to the external acceleration;
    generating a first output signal of a first polarity associated with a displacement of the first proofmass relative to the first null position;

applying the control signals to at least one control element associated with a second proofmass to provide a second force to accelerate the second proofmass toward a second null position associated with the second proofmass, the second proofmass being configured to accelerate in a second direction opposite the first direction in response to the external acceleration, the first proofmass comprising a center of mass that is offset from a centroid location of the first proofmass by a distance that is approximately equal and opposite an offset of a center of mass associated with the second proofmass relative a centroid location of the second proofmass;

generating a second output signal of a second polarity associated with a displacement of the second proofmass relative to the second null position; and generating a difference between the first output signal and the second output signal to calculate the external acceleration that is substantially free from bias error.

12. The method of claim 11, further comprising scaling the difference between the first output signal and the second output signal to calculate the external acceleration having an uncorrelated noise that is reduced by approximately the square root of two.

13. The method of claim 11, wherein the first proofmass and the second proofmass are fabricated as substantially matched components, such that the first and second proofmasses are substantially identical with respect to temperature and process variation.

14. The method of claim 11, wherein applying the control signals comprises:
  applying charge pulses to at least one electrode associated with the first proofmass to provide a first electrostatic force to rotate the first proofmass about a first fulcrum in the first direction toward the first null position; and
  applying the charge pulses to at least one electrode associated with the second proofmass to provide a second electrostatic force of the second polarity to rotate the second proofmass about a second fulcrum in the second direction toward the second null position, and wherein the first proofmass comprises a center of mass that is offset from a centroid location of the first proofmass by a distance that is approximately equal and opposite an offset of a center of mass associated with the second proofmass relative a centroid location of the second proofmass.

15. The method of claim 14, wherein applying the charge pulses comprises alternately applying the charge pulses to the at least one electrode associated with the first proofmass and to the at least one electrode associated with the second proofmass in a predetermined sequence.

16. The method of claim 15, wherein applying the charge pulses to the at least one electrode associated with the first proofmass comprises alternately applying the charge pulses to a first pair of electrically-coupled electrodes and to a second pair of electrically-coupled electrodes at a first duty-cycle that is based on the first output signal to accelerate the first proofmass toward the first null position, the first and second pairs of electrically-coupled electrodes generating opposite electrostatic forces, and wherein applying the charge pulses to the at least one electrode associated with the second proofmass comprises alternately applying the charge pulses to a third pair of electrically-coupled electrodes and to a fourth pair of electrically-coupled electrodes at a second duty-cycle that is based on the second output signal to accelerate the second proofmass toward the second null position, the third and fourth pairs of electrically-coupled electrodes generating opposite electrostatic forces.

17. An accelerometer system comprising:
  a sensor element comprising a first proofmass and a second proofmass, the first proofmass being configured to accelerate in a first direction and the second proofmass being configured to accelerate in a second direction opposite the first direction in response to an external acceleration, the first proofmass and the second proofmass being fabricated as substantially matched components, such that the first and second proofmasses are substantially identical with respect to temperature and process variation;
  a force rebalance controller configured to alternately apply charge pulses to at least one electrode associated with the first proofmass and at least one electrode associated with the second proofmass in a predetermined sequence, the charge pulses being applied to the at least one electrode associated with the first proofmass to provide a first electrostatic force to accelerate the first proofmass toward a first null position associated with the first proofmass and to apply the charge pulses to the at least one electrode associated with the second proofmass to provide a second electrostatic force to accelerate the second proofmass toward a second null position associated with the second proofmass, the force rebalance controller being further configured to generate a first output signal associated with a displacement of the first proofmass relative to the first null position and a second output signal associated with a displacement of the second proofmass relative to the second null position based on applying the charge pulses to the at least one electrode associated with the respective first and second proofmasses, the second output signal having a polarity opposite the first output signal; and
  an acceleration component configured to subtract the first output signal from the second output signal to calculate the external acceleration that is substantially free from bias error.

18. The system of claim 17, wherein the first proofmass is configured to rotate about a first fulcrum in the first and second directions and the second proofmass is configured to rotate about a second fulcrum in the first and second directions, wherein the first proofmass comprises a center of mass that is offset from a centroid location of the first proofmass by a distance that is approximately equal and opposite an offset of a center of mass associated with the second proofmass relative a centroid location of the second proofmass.

19. The system of claim 17, wherein the force rebalance controller comprises:
  a pulse generator configured to generate the charge pulses; and
  a processor configured to generate the first output signal in response to a first measured voltage associated with the at least one electrode associated with the first proofmass and to generate the second output signal in response to a second measured voltage associated with the at least one electrode associated with the second proofmass, the first and second measured voltages resulting from the alternate application of the charge pulses to the at least one electrode associated with the respective first and second proofmasses.

20. The system of claim 19, wherein each of the at least one electrode associated with the first and second proofmasses comprise a first pair of electrodes that are electrically-coupled with respect to each other and a second pair of electrodes that are electrically-coupled with respect to each other, wherein the force rebalance controller further comprises a multiplexer being configured to apply the charge pulses to the first pair of electrodes to accelerate the respective first and second proofmasses in the first direction and to apply the charge pulses to the second pair of electrodes to accelerate the respective first and second proofmasses in the second direction.

* * * * *

UNITED STATES PATENT AND TRADEMARK OFFICE
CERTIFICATE OF CORRECTION

| | |
|---|---|
| PATENT NO. | : 9,229,026 B2 |
| APPLICATION NO. | : 13/085900 |
| DATED | : January 5, 2016 |
| INVENTOR(S) | : Stewart et al. |

It is certified that error appears in the above-identified patent and that said Letters Patent is hereby corrected as shown below:

Claims

Column 12, claim 11, line 64 reads, "response to the external acceleration;" should read - "response to the external acceleration, the first poofmass comprising a center of mass that is offset from a centroid location of the first poofmass by a distance that is approximately equal and opposite an offset of a center of mass associated with a second poofmass relative a centroid location of the second poofmass."

Signed and Sealed this
Nineteenth Day of July, 2016

Michelle K. Lee
*Director of the United States Patent and Trademark Office*